3,280,619
LEAK DETECTION
Johannes Spies, Karlsruhe, Germany, assignor to Kernreaktor Bau- und Betriebs-Gesellschaft m.b.H., Karlsruhe, Germany, a corporation of Germany
Filed July 16, 1962, Ser. No. 210,257
6 Claims. (Cl. 73—40.7)

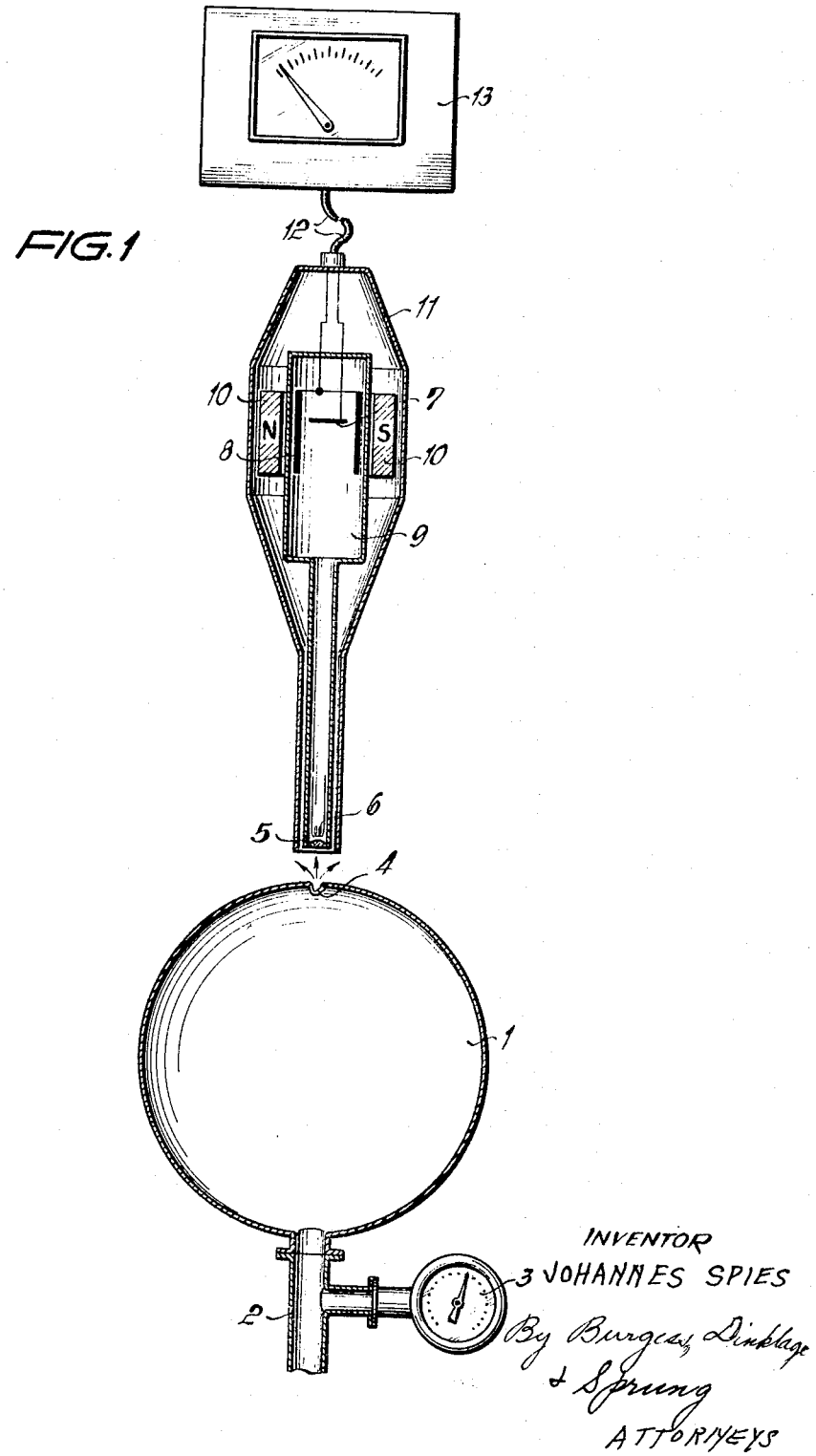

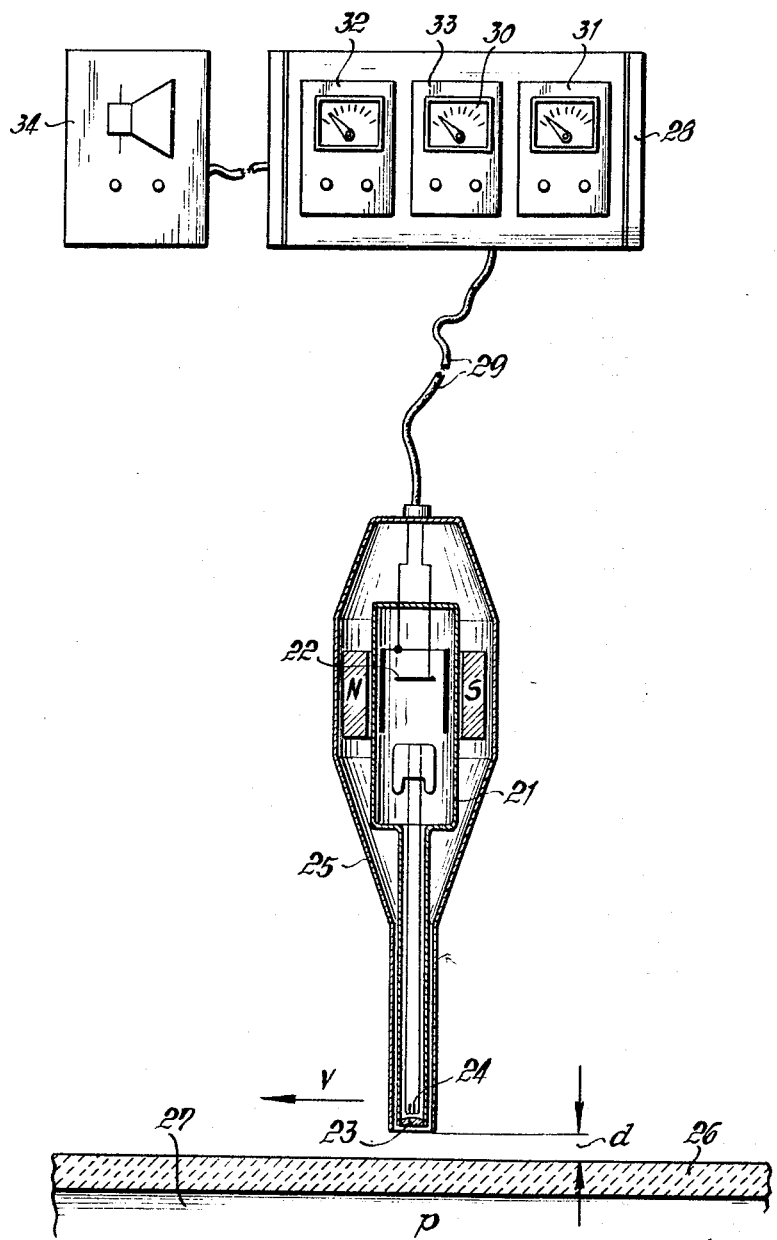

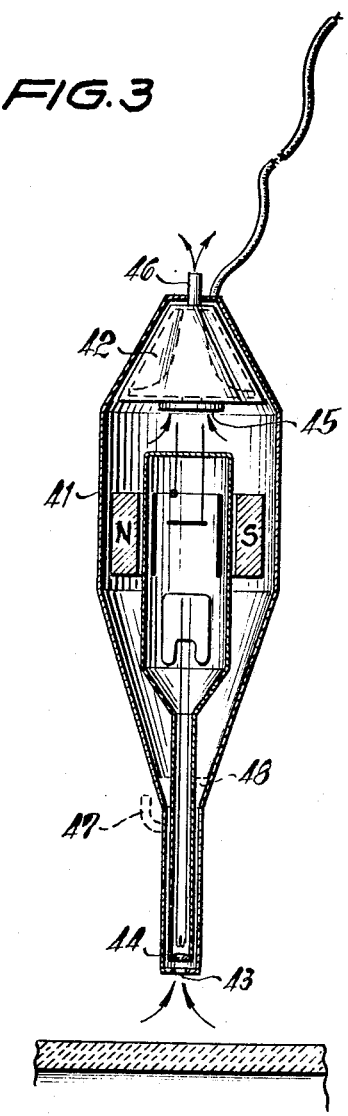

This invention relates to new and useful improvements in leak detection. The invention more particularly relates to a novel method and apparatus for detecting leaks through a surface as for example through the wall of a vessel, through a welded seam or other joint or the like.

One object of the invention is a method and apparatus for leak detection which allows the detection of extremely small leaks with great sensitivity and avoids the prior art disadvantage of requiring the detection instrument to be pressure-connected to the vessel being tested.

A further object of this invention is a highly sensitive leak-detector which avoids the relatively complicated and usually delicate construction of the prior art instruments.

A still further object of this invention is a simple, manually portable leak detection system wherein the detection apparatus may be used as a probe to scan the area being tested and does not require the maintenance of cumbersome connective lines to the vessel being tested.

These and still further objects will become apparent from the following description read in conjunction with the drawings in which:

FIG. 1 is a diagrammatic elevation, partially in section, showing an embodiment of a leak-detection system in accordance with the invention, FIG. 2 is a diagrammatic elevation, partially in section, showing a further embodiment of a leak detection system in accordance with the invention, FIG. 3 is a diagrammatic vertical section showing a further embodiment of a leak detector in accordance with the invention.

In accordance with the invention, leaks extending through a surface, as for example in the wall of a pressure vessel, through a welded seam or other joint are detected by maintaining test gas on one side of the surface under sufficient pressure to pass through a leak if present while scanning the opposite side with a probe type detector. The detector comprises a vacuum envelope, vacuum sealed with a window permeable to the test gas and containing a getter system capable of absorbing the test gas at a different rate than the ambient gas. The window of the detector is maintained adjacent the surface and is preferably moved along the surface over the area to be tested. The presence of a leak is detected by noting a change in pressure in the vacuum envelope.

The term getter system as used herein generically defines any gas absorbing or pumping device which is capable of producing or maintaining a high vacuum of, for example 0.1 torr or less, and which will absorb or pump a chemically active gas at a different rate than an inert gas. These getter systems generally have absorbing or pumping surfaces on which chemically active gases will be held, not only by absorption, but also by chemical reaction whereas inert gases will be held only by absorption so that the former will be pumped or absorbed at a higher rate than the latter.

Preferable getter systems for use in accordance with the invention include the known and conventional ion pumps and ion gauges. Such pumps and gauges are, for example, described in the March 1962 issue of "Scientific American," volume 206, No. 3, beginning at page 178 and any such ion pumps or gauges may be used in accordance with the invention.

In addition to ion pumps or gauges, other high vacuum gas-absorbing systems, as for example, heatable porous metal absorption surfaces, metallic reflectors, such as cathodically sprayed on metallic reflectors, or heated metal layers which will absorb gases at a low pressure through absorption and which will, additionally bind chemically active gases by a chemical reaction at the surface may be used. It is also possible to use a combination of the above-mentioned types of getter systems as for example ion pumps in combination with heatable porous metal absorption surfaces or the like.

The test gas used is preferably an inert gas as for example argon, krypton, xenon, or most preferably helium. With such an inert test gas, the presence of a leak is indicated by an increase in pressure in the vacuum envelope. When the getter system is an ion pump, this change in pressure may be directly determined by a change, i.e., an increase in the ion current of the pump.

While it is preferable to use an inert test gas, it is also possible, within the broadest concepts of the invention to use a chemically active test gas which is pumped at a higher rate by the getter systems than the ambient gas, so that the leak is indicated by a decrease in pressure in the system. Thus, for example, a small pressure vessel may be pressurized with a chemically active test gas, such as air or nitrogen, and surrounded by an inert gas, such as helium, and the presence of the leak will be indicated by a decreased pressure in the vacuum envelope containing the getter system.

The pressure of the test gas need only be sufficient to force the same through a leak being detected and generally a relatively low pressure, as for example, around two atmospheres will suffice. The exact pressure will, of course, depend on the test set up and the pressure which the surface should withstand without leaking may be used.

The window provided on the vacuum envelope containing the getter system must be sufficiently gas impermeable to allow the maintaining of the vacuum and to prevent over-loading or saturation of the collecting surface of the getter system and at the same time must have a certain permeability for the test gas. The window may, for example, be constructed of quartz, glass, palladium, or the like, and may, for example, have a circular surface of about 1–10 mm. in diameter, and preferably about 3–5 mm. in diameter. Additionally, rectangular surfaces of 110 mm., 5x50 mm. and preferably 2x25 mm. may be used. The windows are preferably slightly curved inwardly and have a thickness of between 0.1 to 20$\mu$m. and preferably 1 to 10 $\mu$m. For scanning large surfaces, windows positioned staggered side by side, which are connected with the same vacuum envelope may be used.

The window is preferably selectively permeable to the test gas as compared with the ambient gas, as for example, quartz in connection with helium, and other inert gases, palladium in connection with hydrogen or the like.

Most preferably, the window is selectively permeable to the test gas to such a degree that the partial pressure of the test gas, as for example helium, is just indicated in the normal ambient atmosphere. Thus, the sum of the equilibrium pressures of the air constituents, including nitrogen and oxygen, which occur in the vacuum envelope containing the getter system by diffusion through the window should not be substantially greater than the helium equilibrium pressure occurring through the normal helium content of the air. Thus, for example, in the normal air, the partial pressure of nitrogen is 200,000 times as great as that of helium whereas the absorption capabilities of the getter system are only about 10–20 times as great for the helium as nitrogen. Thus, the window should preferably be at least about 10,000 times less permeable to nitrogen than helium. This also applies to the other gas constituents in the ambient air.

In accordance with a preferred embodiment of the invention, the permeability of the window, as for example the quartz window, is initially adjusted to the desired value, as for example, by temperature control, and most preferably by means of an electric heating device, as for example by providing electric resistance heating wire or an infra-red radiation element positioned in front of or around the window. The heating is preferably so adjusted that a pre-calculated equilibrium pressure in the presence of pure helium is established.

By the use of the getter system sealed in the vacuum envelope and provided with the window which is permeable to the test gas, the leak detection may be achieved with the detection apparatus completely free of connections with the vessel or other surface being tested and completely free of any apparatus in its vicinity except for example for the electric lines connecting it to the measuring apparatus. It is thus possible to pass the detector along the outside of the vessel being tested in a very simple manner and in a limited work space. The provision of the window not only makes possible a leak detector of simple construction but allows the use of a getter system of extremely simple design since most of the nitrogen and other active ambient gas components are excluded from the helium-air mixture which passes through the window into the vacuum envelope. The separating effect of the getter system, then suffices to reduce the partial pressure of nitrogen, etc. to such an extent that the total pressure that establishes itself in the system depends only on the partial pressure of the helium. Therefore, this pressure is a measure of the amount of helium passing through the leak and ultimately the size of the leak.

Referring to the embodiment of FIG. 1 of the drawing, 1 represents the pressure vessel which is to be tested for leaks. This vessel is filled through line 2 with a test gas such as helium up to a certain over-pressure which will force the helium through the leak 4. This over-pressure may be read on the pressure gauge 3.

The portable leak detector consists of a vacuum envelope 9 positioned in a housing 11. The vacuum envelope 9 is provided with the quartz window 5 and the heating element 6 in the form of resistance heating wire for controlling the permeability of the window 5.

The vacuum envelope 9 is provided with a getter system in the form of a "sputter ion pump" having the magnetic field coils 10 provided in the housing 11, the central positive anode 7 and the negative collector plate and cathode 8.

The getter system is connected by means of the electrical wires 12 to the conventional ammeter 13 which indicates the ion current of the sputter ion pump.

In operation, the permeability of the quartz window 5 is first adjusted so that a precalculated equilibrium pressure is obtained in pure helium, this pressure being indicated by the ion current as shown on the ammeter 13. The surface of vessel 1 is then scanned by passing the window 5 over the surface adjacent thereto. When the window passes over the leak 4, the helium test gas will pass through the window 5 into the vacuum envelope 9. The sputter ion pump that forms the getter system operates by emitting electrons from the cathode 8 which is preferably constructed of titanium. The electrons move toward the central anode 7 and are accelerated in a spiral path due to the magnetic field formed by the magnet 10. As these spirally accelerated electrons strike a gas molecule, the same is converted to a positive ion which is attracted to the negative collector plate 8 and thus absorbed or pumped away. Active gases, such as nitrogen, are pumped at a much higher rate due to the fact they additionally chemically react with the collector plate. The helium, however, does not so chemically react and is pumped at a much slower rate so that the internal pressure in the envelope 9 is to a large extent determined by the partial pressure of the helium. Thus, as helium passes through the window 5, the internal pressure in the vacuum envelope 9 increases and this increase is directly indicated by an increase in the ion current directly read at the ammeter 13. The presence of a leak is thus indicated by a rise in current as indicated at 13.

By using a getter system wherein the current consumption is proportional to the internal pressure of the system, the amount of the test gas passing through the window 5 may be determined simply and directly by measuring the current drain. If, however, a getter system is used whose internal pressure is not proportional to the current, the change in pressure in the envelope 9 may be determined in any other known or conventional manner.

As may be seen, the detector itself is solely connected to the measuring instrument by an electrical conductor and thus is substantially lighter and smaller than the prior art detectors and substantially less subject to disturbances.

In order to ensure that any test gas passing through the leak will contact the window 5 and thus pass therethrough, a positive gas circulation through the housing 11 forcing gas in contact with the window 5 may be provided.

Thus, as shown in FIG. 3, the housing for the system, which is designated as 41, may be provided with a blower 42, as for example in the form of a small electric fan or impeller with an inlet 45 and outlet 46. The gas is thus sucked by this impeller through the housing in contact with the window designated 44 through the inlet 45 and out of the outlet 46.

Alternately, a simple suction line 47 may be provided which is connected by a flexible conduit to a vacuum pump. In this embodiment, it is preferable to provide a seal 48 so that the gas will simply pass through the lower portion of the housing in contact with the window 44. As shown in the embodiment of FIG. 3, the bottom of the housing in front of the window, rather than being open, is provided with a small aperture 43.

The following example, described in conjunction with FIG. 2 of the drawings is given by way of illustration and not limitation.

EXAMPLE

The welded seam 36 of a container 27 is tested for leaks. The leak detector used consists of a housing 25 provided with a vacuum envelope 21 and a sputter ion pump 22 of conventional construction. The vacuum envelope 21 is provided with a quartz window 23 of about 4 mm. diameter and about 5 millimicrons thickness which may be heated by the electric heating element 24 consisting of a coiled resistance wire. The detector is connected by means of the electrical wires 29 to a console-type control panel which contains an adjustable current supply 31 of conventional construction for the ion pump, a rheostat control 32 for controlling the supply of current to the heating element 24 and an ammeter 33 provided with a dial 30 for determining the ion current of the ion pump. The ammeter is preferably provided with a direct current amplifier of conventional construction. Additionally, a buzzer device 34 may be provided which buzzes when the current indicated in the ammeter 33 reaches a predetermined value.

The permeability of the window 23 is initially adjusted by placing the device in contact with pure helium and regulating the temperature by means of the rheostat 32 until the ion current as indicated on the dial 30 is, for example $10^{-4}$ amps. In the presence of the ambient atmosphere, i.e. ordinary air, current reading on the dial 30 will then be $10^{-8}$ amps. The buzzer signal 34 is set to buzz when the current exceeds $10^{-8}$ amps. The container 27 is then charged to a pressure of 2 atmospheres gauge with about 50% helium. The pressure chosen should be a pressure which the wall should be able to withstand without a leak. When using larger containers, it may be preferable to use a smaller helium content, as for example 10% for economy reasons. The window 23 is then moved along adjacent to the weld at a distance of 1 millimeter with a speed of 20 millimeters per second. A leak is indicated by a buzzing of the signal 34 and an increase in the ion current to above $10^{-8}$ amps.

The actual value of the ion current as read on the dial 30 is an indication of the size of the leak and it is possible to fairly and accurately calibrate the same against leaks of known size measured under substantially indentical conditions.

While the invention has been described in detail, with reference to certain specific embodiments, various changes and modifications which fall within the spirit of the invention and scope of the appended claims will become apparent to the skilled artisan. The invention, therefore, is only intended to be limited by the appended claims or their equivalents wherein I have endeavored to claim all inherent novelty.

The preferred constructional materials of the vacuum envelope are glass, quartz or stainless steel and of the housing brass or aluminum. The preferred pressure, which is maintained in the vacuum envelope, is for example about $10^{-6}$ micron.

I claim:

1. Method for detecting leaks through a surface which comprises maintaining a test gas on one side of said surface under sufficient pressure to pass through a leak if present, maintaining a vacuum envelope vacuum sealed with window permeable to test gas and containing a getter system capable of absorbing the test gas at a different rate than the ambient gas on the opposite side of said surface, with the window adjacent the surface, initially adjusting the permeability of said window by heating, and detecting the presence of a leak by a change in pressure in said envelope.

2. Method for detecting leaks through a surface which comprises maintaining a substantially inert test gas on one side of said surface under sufficient pressure to pass through a leak if present, passing along on the opposite side of said surface, a vacuum envelope, vacuum sealed with a window permeable to the test gas and containing an ion pump while maintaining said window adjacent the surface, initially adjusting permeability of said window by varying the temperature thereof while the window is in contact with pure test gas, and detecting the presence of a leak by an increase in the ion current of said pump.

3. Method according to claim 2 in which the permeability of the window is adjusted by electrical heating.

4. A leak detector comprising a vacuum envelope vacuum sealed with a window permeable to test gas, an ion pump disposed within said envelope, electrical heating means disposed within said envelope for heating said window to adjustably vary the permeability thereof, an electrical circuit means operatively connected to said ion pump for sensing variations in the ion current thereof whereby the presence of test gas within said envelope is indicated.

5. The leak detector according to claim 4 wherein said permeable window is a quartz window.

6. The leak detector according to claim 4 in which said vacuum envelope is positioned in a housing and including means for drawing gas into said housing in contact with said window.

References Cited by the Examiner

UNITED STATES PATENTS

| | | | |
|---|---|---|---|
| 2,526,038 | 10/1950 | Nelson. | |
| 2,863,315 | 12/1958 | Penning | 73—40.7 |
| 2,909,919 | 10/1959 | Myer | 73—23 |
| 2,947,166 | 8/1960 | Palmer et al. | 73—40.7 |
| 2,972,690 | 2/1960 | McCoubrey | 324—33 X |
| 2,993,169 | 7/1961 | Poly | 324—33 X |
| 3,070,992 | 1/1963 | Nemeth | 73—40.7 |
| 3,100,868 | 8/1963 | McAfee | 324—33 |

FOREIGN PATENTS 1,181,312  1/1959  France.

OTHER REFERENCES

Journal of Physical Chemistry (Journal II). Volume 36 (1932); pages 2595–2599 relied on.

Electronic Industries and Electronic Instrumentation (Electronics Industries), March 1948, pages 7–8 relied on.

American Ceramic Society Journal, volume 36, March 1953, pages 90–96 relied on.

Journal of Applied Physics (Journal I), volume 28, No. 1, January 1957; pages 34–39 relied on.

LOUIS R. PRINCE, *Primary Examiner.*

ISAAC LISANN, *Examiner.*

R. T. FROST, J. D. BOOS, *Assistant Examiners.*